(12) United States Patent
Banks et al.

(10) Patent No.: US 10,801,994 B2
(45) Date of Patent: Oct. 13, 2020

(54) PIPE PIG

(71) Applicant: i2i Pipelines Limited, Greater Manchester (GB)

(72) Inventors: Steve Banks, Greater Manchester (GB); Sung Quek, Greater Manchester (GB); Vladimir Torres, Greater Manchester (GB); Bosco Fernandes, Greater Manchester (GB)

(73) Assignee: I2I PIPELINES LIMITED, Greater Manchester (GB)

( * ) Notice: Subject to any disclaimer, the term of this patent is extended or adjusted under 35 U.S.C. 154(b) by 321 days.

(21) Appl. No.: 15/746,293

(22) PCT Filed: Jul. 20, 2016

(86) PCT No.: PCT/GB2016/052182
§ 371 (c)(1),
(2) Date: Jan. 19, 2018

(87) PCT Pub. No.: WO2017/013426
PCT Pub. Date: Jan. 26, 2017

(65) Prior Publication Data
US 2020/0088684 A1    Mar. 19, 2020

(30) Foreign Application Priority Data
Jul. 22, 2015 (GB) .................................. 1512905.9

(51) Int. Cl.
*G01N 27/90* (2006.01)
*F16L 55/38* (2006.01)
(Continued)

(52) U.S. Cl.
CPC ............ *G01N 27/902* (2013.01); *F16L 55/38* (2013.01); *F16L 55/40* (2013.01); *G01N 27/904* (2013.01);
(Continued)

(58) Field of Classification Search
CPC ..... G01N 27/902; G01N 27/904; F16L 55/38; F16L 55/40
See application file for complete search history.

(56) References Cited

U.S. PATENT DOCUMENTS

| 5,115,196 A | 5/1992 | Low et al. |
| 5,565,633 A | 10/1996 | Wernicke |

(Continued)

FOREIGN PATENT DOCUMENTS

| CN | 202746846 | 2/2013 |
| DE | 3719492 | 12/1988 |

(Continued)

OTHER PUBLICATIONS

International Search Report & Written Opinion, European Patent Office, dated Sep. 26, 2016, 19 pages.
(Continued)

*Primary Examiner* — David Z Huang
(74) *Attorney, Agent, or Firm* — Taft Stettinius & Hollister LLP; Stephen F. Rost

(57) ABSTRACT

A pipe pig for travelling along the bore of a pipe, the pipe pig comprising a tubular body extending along a longitudinal axis between a first end and a second end, and a plurality of discs extending radially from the longitudinal axis. At least one of the discs is a sensor disc that includes a plurality of electromagnetic sensors disposed therein.

17 Claims, 3 Drawing Sheets

(51) Int. Cl.
*F16L 55/40* (2006.01)
*F16L 101/30* (2006.01)

(52) U.S. Cl.
CPC ...... *F16L 2101/30* (2013.01); *G01N 27/9033* (2013.01)

(56) References Cited

U.S. PATENT DOCUMENTS

2006/0220640 A1    10/2006  Thompson et al.
2012/0131758 A1*    5/2012  Bacon .................. F16L 55/38
                                                                                             15/104.062
2014/0080224 A1    3/2014  Tunheim et al.

FOREIGN PATENT DOCUMENTS

DE    10 2009 020570    6/2012
KR    101491416    2/2015
WO    9500840 A1    1/1995

OTHER PUBLICATIONS

Search Report under Section 17(5), United Kingdom Intellectual Property Office, dated Jan. 22, 2016, 4 pages.

* cited by examiner

PIPE PIG

This application is a U.S. national stage application under 35 U.S.C. § 371 of PCT International Application Serial No. PCT/GB2016/052182, which has an international filing date of Jul. 20, 2016, designates the United States of America, and claims the benefit of GB Application No. 1512905.9, which was filed on Jul. 22, 2015, the disclosures of which are hereby expressly incorporated by reference in their entirety.

The present invention relates to a pipe pig, and in particular, to a pipe pig for inspecting a pipeline.

BACKGROUND

A pipe pig is a vessel that travels along the bore of a pipeline, such as an oil pipeline. Pipe pigs are often propelled along the pipeline by fluid (e.g. oil) flowing within the pipeline. So-called inspection pipe pigs often include sensors for collecting data about the pipeline as the pipe pig travels along the pipe and may be used to inspect the condition of the pipe walls.

An example of a typical inspection pig is described in US-A-2007022830 which makes use of magnetic flux sensors for collecting data. The sensors are mounted on moveable arms that extend from a rigid body, where the moveable arms ride against the internal profile of the pipeline as the inspection pig travels through the pipe.

Inspection pigs are often long, heavy and expensive pieces of apparatus that require a specialist launching station for inserting the pig into the pipeline and a specialist receiving station for retrieving the pig from the pipeline. As such, the preparation, travel and retrieval of an inspection pipe pig through a pipeline is an expensive, time-consuming and disruptive process. Furthermore, inspection pigs are known for being liable to get stuck within a pipeline and this often results in the pipeline being shutdown until the stuck inspection pig is removed. For certain pipelines (e.g. oil pipelines), any shutdown can be significantly costly. Inspection pigs are often sized for a specific diameter pipeline and have limited ability in negotiating bends in the pipeline or moving between areas of the pipeline with differing diameters. Therefore, a given inspection pig may only be used with pipelines having a suitable specification and multiple inspection pigs are required for inspection of wider ranges of pipelines.

Other types of known pipe pigs include utility pigs which are used to clean pipes. A utility pig typically consists of a solid steel tubular body with polymeric discs extending radially therefrom that serve to cup against the pipeline fluid to propel the pig along the pipe and further polymeric discs that serve to clear debris from the pipeline as the pig travels along.

It is an object of certain embodiments of the present invention to provide an improved pipe pig that improves upon or overcomes at least some of the disadvantages associated with the prior art.

BRIEF SUMMARY OF THE DISCLOSURE

In accordance with an aspect of the present invention there is provided a pipe pig for travelling along the bore of a pipe, the pipe pig comprising:
  a tubular body extending along a longitudinal axis between a first end and a second end; and
  a plurality of discs extending radially from the longitudinal axis;
  wherein at least one of the discs is a sensor disc that includes a plurality of electromagnetic sensors disposed therein.

The plurality of electromagnetic sensors may include means for inducing an electric current in a wall of the pipe, and means for receiving an electromagnetic signal from the wall of the pipe, such that data about the pipe wall can be obtained as the pipe pig travels along a bore of the pipe. The means for inducing an electric current in the wall of the pipe may include a generating coil for producing a magnetic field, where the generating coil may produce a time varying magnetic field. Alternatively, the means for inducing an electric current in the wall of the pipe may include a magnet, where the magnet may be a permanent magnet. The means for receiving an electromagnetic signal from the wall of the pipe may include a receiving sensor.

The plurality of electromagnetic sensors may be disposed on one or more carriers that are disposed in at least one of the discs.

The tubular body may include an internal cavity for containing one or more electronic components. The internal cavity may contain a housing for containing the one or more electronic components. The housing may be removable from the tubular body. The housing may comprise a steel or stainless steel housing. The housing may be capable of withstanding pressures up to 100 bar, 150 bar, 200 bar, 250 bar or 300 bar. The one or more electronic components may include an electrical power source for supplying electrical power to the plurality of electromagnetic sensors. The electrical power source may be a rechargeable electrical power source. In certain embodiments, the one or more electronic components may include a memory for receiving data from the plurality of electromagnetic sensors.

At least one of the plurality of discs may comprise a deformable material, where the deformable material may be a plastics material.

The pipe pig may comprise at least one sensor disc adjacent the first end of the tubular body and at least one sensor disc adjacent the second end of the tubular body.

At least one of the plurality of discs may be a pigging disc that is configured to receive and redirect force from a fluid flowing within the bore of the pipe so as to propel the pipe pig along the pipe. The pipe pig may comprise at least one pigging disc adjacent the first end of the tubular body and at least one sensor disc adjacent the second end of the tubular body. Each pigging disc may comprise a deformable material. Additionally or alternatively, at least one of the plurality of discs may be a guardian disc that has a smaller diameter relative to the pigging disc, the guardian disc being less deformable than the pigging disc and being configured to limit contact between the tubular body and the pipe. The pipe pig may comprise at least one guardian disc adjacent the first end of the tubular body and at least one sensor disc adjacent the second end of the tubular body. Each guardian disc may comprise a deformable material. At least one sensor disc may be axially disposed between one of the pigging discs and one of the guardian discs.

In certain embodiments, the tubular body may comprise a metal. In alternative embodiments, the tubular body may comprise a deformable material.

In certain embodiments, the sensor disc may comprise a deformable material.

In certain embodiments, the plurality of electromagnetic sensors may be embedded in the sensor disc.

In accordance with an aspect of the present invention there is provided a method of manufacturing a sensor disc for a pipe pig, comprising:

providing a plurality of electromagnetic sensors: and
forming a disc around the plurality of electromagnetic sensors such that the plurality of electromagnetic sensors are disposed therein.

Forming the disc around the plurality of electromagnetic sensors may comprise introducing liquefied material into a mould containing the plurality of electromagnetic sensors and solidifying the liquefied material. The liquefied material may be molten plastics material. The plurality of electromagnetic sensors may be supported on one or more carriers within the mould. The plurality of electromagnetic sensors may include means for inducing an electric current in a wall of the pipe, and means for receiving an electromagnetic signal from the wall of the pipe, such that data about the pipe wall can be obtained as the pipe pig travels along a bore of the pipe.

The means for inducing an electric current in the wall of the pipe may include a generating coil for producing a magnetic field, where the generating coil may produce a time varying magnetic field.

Alternatively, the means for inducing an electric current in the wall of the pipe may include a magnet, where the magnet may be a permanent magnet.

The means for receiving an electromagnetic signal from the wall of the pipe play include a receiving sensor.

In accordance with an aspect of the present invention there is provided a method of manufacturing a pipe pig, comprising providing at least one sensor disc including a plurality of electromagnetic sensors disposed therein, and attaching the sensor disc to a tubular body that extends along a longitudinal axis such that the at least one sensor disc extends radially from the longitudinal axis. In certain embodiments, providing the at least one sensor disc comprises manufacturing the at least one sensor disc in accordance with the method described above.

BRIEF DESCRIPTION OF THE DRAWINGS

Embodiments of the invention are further described hereinafter with reference to the accompanying drawings, in which.

DETAILED DESCRIPTION

Figure 1:
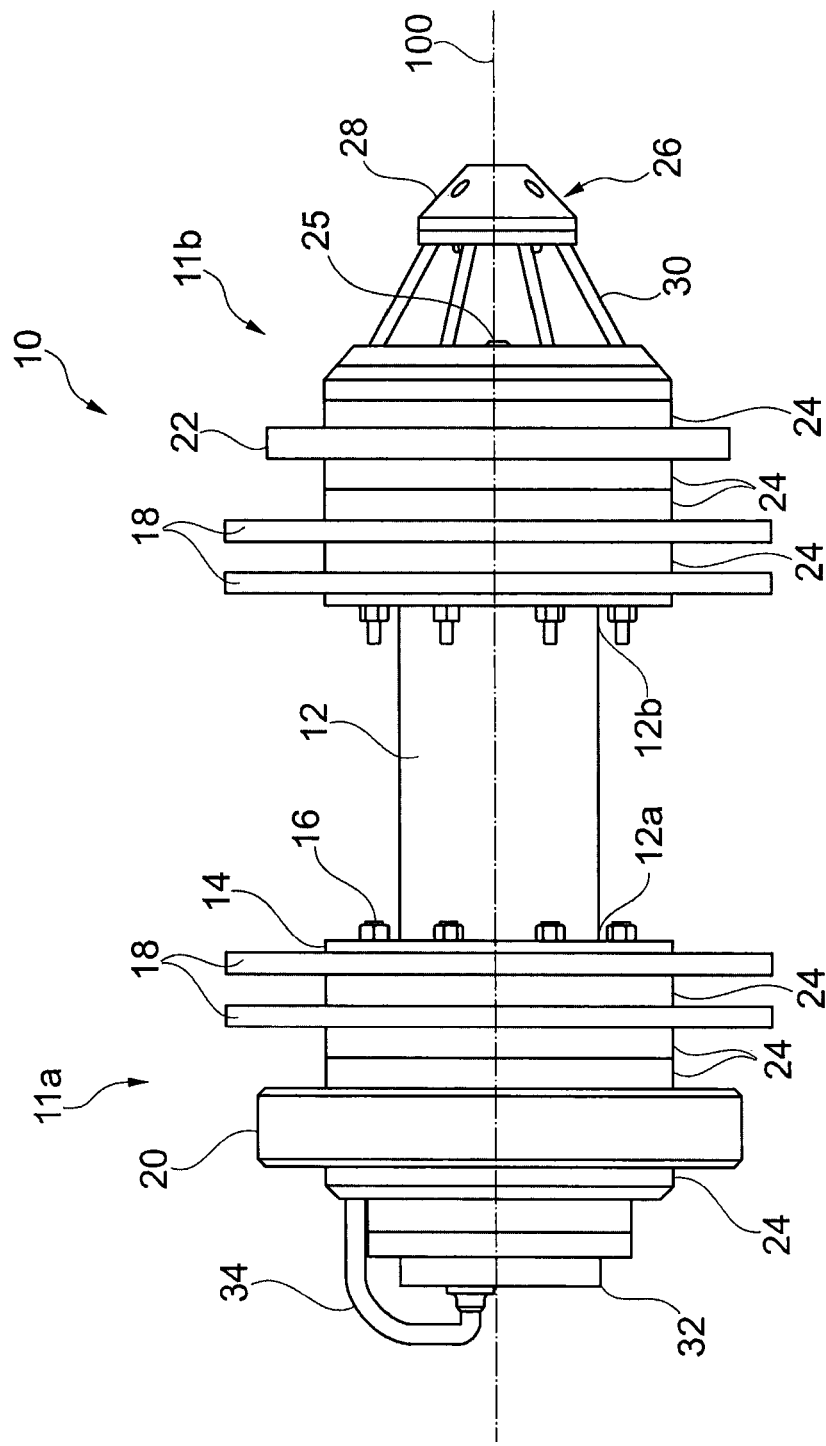
FIG. 1 is a side view of a pipe pig according to an embodiment of the present invention.
Figure 2:
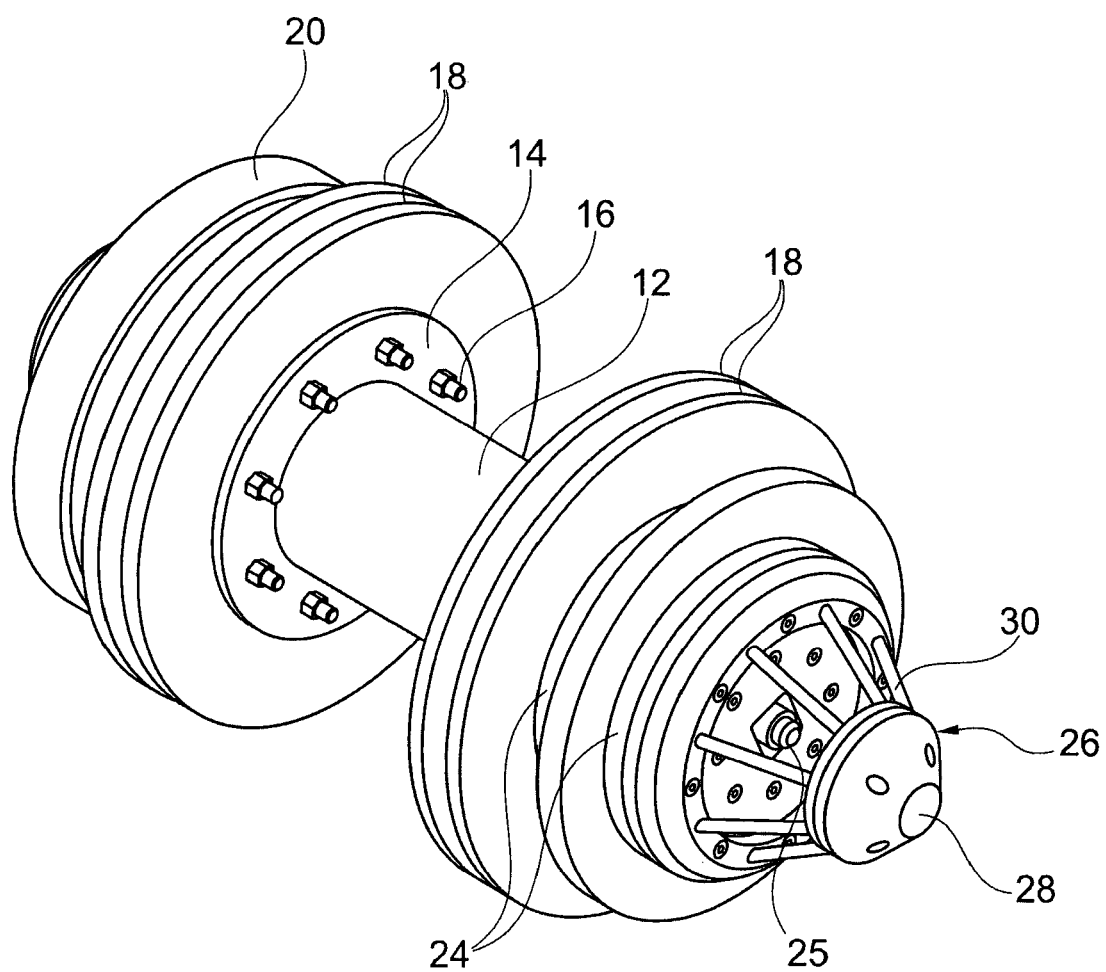
FIG. 2 is a perspective view of the pipe pig of FIG. 1.

FIG. 1 shows a side view of a pipe pig 10 according to an embodiment of the present invention. FIG. 2 shows a perspective view of the pipe pig 10 of FIG. 1. The pipe pig 10 is configured for travelling along the bore of a pipe (not shown). The pipe pig 10 has a tubular body 12 that extends along a longitudinal axis 100 between a first end 12a and a second end 12b. In the illustrated embodiment, the tubular body 12 is cylindrical. However, in other embodiments, the tubular body 12 may be otherwise shaped. In certain embodiments, the tubular body 12 may be hollow. As is described in further detail below, a cavity of the tubular body 12 may contain one or more components such as electrical components. The tubular body 12 may be made from a metal such as steel. In other embodiments, the tubular body 12 may be made from a deformable material such as plastics so as to increase the maneuverability of the pipe pig 10.

The pipe pig 10 includes a plurality of discs that extend radially from the longitudinal axis 100. The discs are round and extend circumferentially around the longitudinal axis 100. That is, the plane of each disc is arranged perpendicularly relative to the longitudinal axis 100. One of the plurality of discs is a sensor disc 20 that includes a plurality of electromagnetic sensors disposed therein. In one preferable embodiment, the electromagnetic sensors are embedded into the material that forms the sensor disc 20. As is described in further detail below, the electromagnetic sensors may be moulded into the sensor disc 20 during formation of the sensor disc 20. That is, the electromagnetic sensors may be held in the mould (e.g. by a carrier) whilst molten material (e.g. molten plastics) is poured into the mould and allowed to solidify in the desired shape. In other embodiments, the plurality of electromagnetic sensors may be otherwise disposed in the sensor disc 20. For example, the plurality of electromagnetic sensors may be disposed in one or more cavities within the sensor disc 20. In certain preferable embodiments, the sensor disc 20 may be made from a deformable material such as plastics. The use of deformable materials affords a degree of flexibility which may reduce the likelihood of the pipe pig 10 becoming stuck within the pipe.

The pipe pig 10 illustrated in FIGS. 1 and 2 additionally includes four pigging discs 18 arranged in two pairs where a first pair is arranged adjacent to the first end 12a of the tubular body 12 and a second pair is arranged adjacent to the second end 12b of the tubular body 12. The pigging discs 18 are configured to receive and redirect force from a fluid flowing within the bore of the pipe so as to propel the pipe pig 10 along the pipe. In particular, the pigging discs 18 may have a diameter that is greater than the diameter of the sensor disc 20. Preferably, the pigging discs 18 have a diameter that is comparable to the inner diameter of the pipe such that the pigging discs form a partial fluidic seal when the pipe pig 10 is disposed in the pipe. The partial fluidic seal causes fluidic pressure to increase upstream of the pigging discs 18 and propel the pipe pig 10 along the pipe. The pigging discs 18 are preferably formed from a deformable material. The pigging discs 18 may be used to collect, break-up or otherwise move or remove debris from the inside of the pipe whilst the pipe pig 10 travels along the pipe.

The illustrated pipe pig 10 additionally includes a guardian disc 22 that has a smaller diameter relative to the pigging discs 18. The guardian disc 22 preferably has a diameter that is greater than the sensor disc 20. The guardian disc 22 is less deformable than the pigging discs 18 and is configured to limit contact between the tubular body 12 and the pipe wall. That is, the guardian disc 22 seeks to keep the longitudinal axis 100 of the pipe pig 10 coaxial with a longitudinal axis of the pipe, e.g. when the pigging discs 18 are deformed and/or the pipe pig 10 is travelling around a bend in the pipe.

As shown in FIGS. 1 and 2, one or more spacer discs 24 may be provided between any one or more of the sensor disc 20, pigging discs 18, and guardian disc 22 to provide an axial separation therebetween. In the illustrated embodiment, the spacer discs 24 have a smaller diameter than each of the sensor disc 20, pigging discs 18, and guardian disc 22. By providing axial separation, the radially outermost parts of the discs 18, 20, 22 may flex (i.e. move axially) if their deformability allows.

In certain embodiments, any number of sensor discs 20, pigging discs 18, guardian discs 22 and/or spacer discs 24 may be provided. In one embodiment, the or each sensor disc 20 may be disposed axially between one pigging disc 18 and one guardian disc 22. Any or all of the plurality of discs 18, 20, 22 may be disposed at any suitable location on the pipe pig 10. For example, any of the plurality of discs 18, 20, 22 may be disposed at or adjacent either of the first end 12a and second end 12b.

In the illustrated embodiment, the tubular body 12 is affixed to two of the pigging discs 18 by a plurality of nut and bolt assemblies passing through clamp rings 14. In other embodiments, the discs may be connected to the tubular body 12 by other means or mechanisms. In certain embodiments, the tubular body 12 may extend through the discs such that some or all of the discs circumferentially surround the tubular body 12.

The pipe pig 10 shown in FIGS. 1 and 2 includes a nose protector 26. The nose protector 26 includes a bumper component 28 connected to one end of the pipe pig 10 by a series of struts 30. The nose protector 26 may provide protection to the pipe pig 10 as it travels through the pipe. In particular, the nose protector 26 may break up any debris contained in the pipe which might damage the pipe pig 10. Additionally or alternatively, the nose protector 26 may absorb some impact force when the pipe pig 10 encounters an object within the pipe, thereby reducing the impact experienced by the remainder of the pipe pig 10. In other embodiments, the nose protector 26 may take on any suitable form that provides some degree of protection to the pipe pig 10. For example, in other embodiments, the bumper component 28 may be connected directly to the pipe pig 10, or it may be connected by means other than the struts 30.

The plurality of electromagnetic sensors may be connected to one or more electronic components. In the illustrated embodiment, the pipe pig 10 includes a housing 32 that extends into a cavity of the hollow tubular body 12. The housing 32 is configured to contain one or more electronic components which are connected to the plurality of sensors by an electrical cable 34. In order to provide adequate protection to the one or more electronic components, the housing 32 is capable of withstanding pressures typically encountered within pipes carrying fluids. In certain embodiments, the housing 32 its capable of withstanding pressures up to 100 bar, 150 bar, 200 bar, 250 bar or 300 bar. The one or more electronic components may include an electrical power source (e.g. a battery) for supplying electrical power to the plurality of electromagnetic sensors. The electrical power source may be a rechargeable electrical power source (e.g. a rechargeable battery). Additionally or alternatively, the one or more electronic components may include a memory device for receiving and storing data from the plurality of electromagnetic sensors. The housing 32 may be removable from the pipe pig 10 and/or the one or more electronic components may be removable from the housing 32 (e.g. to replace or recharge the electrical power source and/or to retrieve data from the memory device). In other embodiments, the tubular body 12 may provide sufficient protection to any electrical components contained therein such that the housing 32 may be dispensed with.

In the illustrated embodiment, the pipe pig 10 includes an electrical connector 25 at a front end of the pipe pig 10. The electrical connector 25 may permit connection of the pipe pig 10 via an electrical cable to a separate "battery pig" that may provide power to the pipe pig 10 (e.g. on particularly long runs where an on-board battery would be unsuitable). The battery pig may also include an electrical power source (e.g. a battery) contained in a protective (e.g. pressure resistant) housing. The pipe pig 10 may be tethered to the battery pig such that the pipe pig 10 follows or leads the battery pig when travelling through the pipe. The electrical connector 25 may therefore be located at any suitable position on the pipe pig 10. In embodiments where the electrical connector 25 is located on the front of the pipe pig 10 and the pipe pig includes a nose protector 26, the nose protector is preferably configured so as to allow access to the electrical connector 25.

Figure 3A:
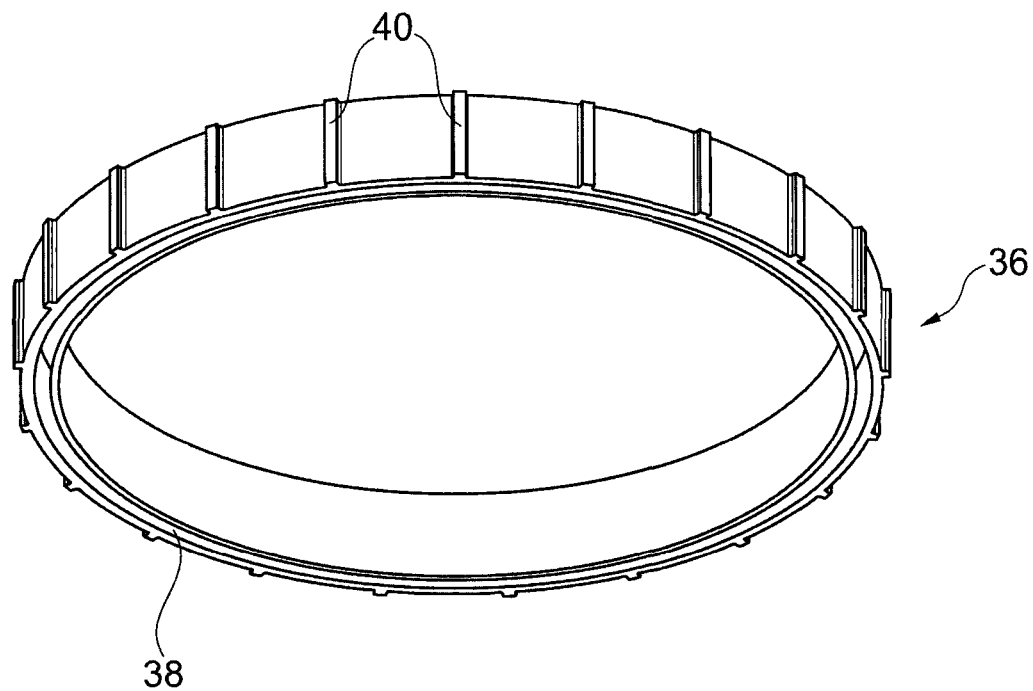
FIG. 3A shows a carrier for supporting a plurality of electromagnetic sensors in a sensor disc.

FIG. 3A shows a carrier 36 for supporting a plurality of electromagnetic sensors in a sensor disc 20 in accordance with an embodiment of the invention. The carrier is cylindrical and includes a plurality of axial ribs 40 on an outer surface. The ribs 40 define regions therebetween for receiving electromagnetic sensors. The ribs 40 also provide structural rigidity to electromagnetic sensors mounted to the carrier 40 and prevent or limit the electromagnetic sensors from moving relative to one another. The carrier 36 additionally includes a groove 38 that runs along a circumference of the carrier 36. The groove 38 provides a channel for receiving wiring from the plurality of electromagnetic sensors.

Figure 3B:
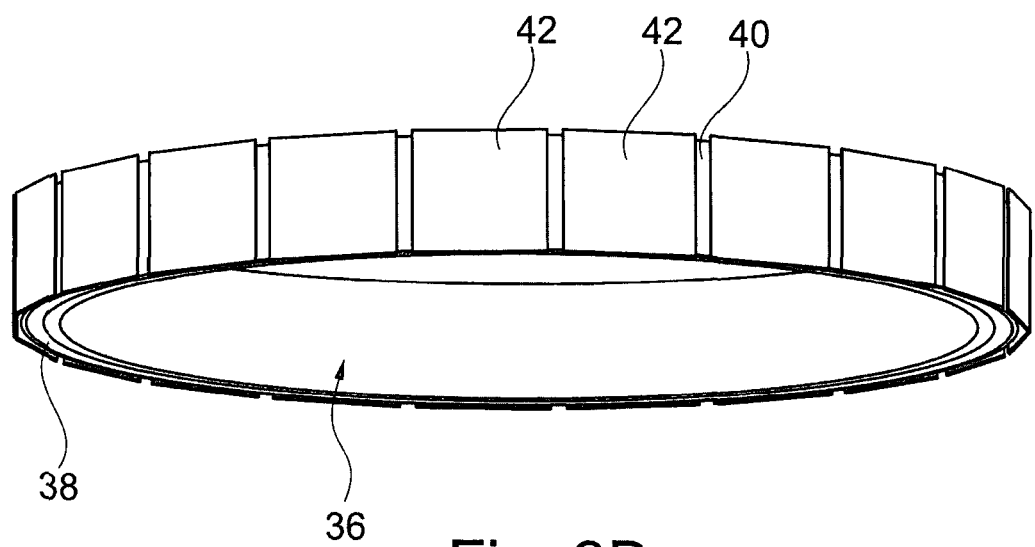
FIG. 3B shows the carrier of FIG. 3A with a plurality of electromagnetic sensors disposed thereon.

FIG. 3B shows the carrier 36 of FIG. 3A with a plurality of electromagnetic sensors 42 mounted thereon. A plane of each electromagnetic sensor 42 is arranged perpendicularly relative to radial directions from the center of the carrier 36.

The electromagnetic sensors 42 may be provided on the carrier 36 as shown in FIG. 3B, and the sensor disc 20 may be formed around the carrier 36 so that the electromagnetic sensors 42 are disposed in the finished sensor disc 20. As noted above, in certain embodiments, the sensor disc 20 may be moulded around the carrier 36. In particular, molten material (e.g. plastics) may be poured into a mould in which the carrier 36 is disposed, and the material may be allowed to solidify to provide the finished sensor disc 20 (e.g. in which the carrier is coaxial with the finished sensor disc 20). In certain embodiments, further components of the pipe pig 10 may be moulded in a single mould where part of the mould defines the sensor disc 20. In certain embodiments, the whole pipe pig 10 may be moulded, e.g. in a single mould.

The plurality of electromagnetic sensors 42 may include means for inducing an electric current in a wall of a pipe as the pipe pig 10 travels through the bore of the pipe. In certain embodiments, the means for inducing an electric current in the pipe wall may include a generating coil that is energized to produce a magnetic field which, in turn, induces an electric current in the pipe wall. The magnetic field produced by the generating coil may be a time varying magnetic field (e.g. by energizing the generating coil with an AC current). Alternatively, the magnetic field may not be time varying and the movement of the generating coil (which is attached to the moveable pipe pig 10) relative to the pipe wall may cause the induction of an electric current in the pipe wall. In further alternative embodiments, the means for inducing an electric current in the pipe wall may include a magnet (e.g. a permanent magnet or electromagnet) that moves (by virtue of the moving pipe pig 10) relative to the pipe wall to induce an electric current therein.

The electromagnetic sensors 42 may additionally include means for receiving an electromagnetic signal from the wall of the pipe, such that data about the pipe wall can be obtained as the pipe pig 10 travels along the bore of the pipe. In certain embodiments, the means for receiving an electromagnetic signal from the wall of the pipe include a receiving sensor. For example, the receiving sensor may be a coil wherein a current is induced in the coil in response to an electromagnetic signal. In certain embodiments, the electromagnetic sensors 42 may be any sensors capable of performing eddy current testing.

The electromagnetic sensors 42 may be provided as one or more printed circuit boards (PCBs) which may, in certain embodiments, be flexible. In certain embodiments, each sensor may include a single generating coil and two receiving sensors.

Pipe pigs 10 according to certain embodiments of the invention may therefore be advantageous in that they may be manufactured for a similar cost to prior art utility pigs. They may also be as maneuverable as utility pigs of the prior art and may not require specialist launching and receiving stations for inserting and retrieving the pipe pig 10 from the pipe. Thus, the operational costs and risk of the pipe pig 10 becoming stuck are reduced. Unlike utility pigs of the prior art, however, pipe pigs 10 according to embodiments of the present invention are capable of obtaining data about the pipe as the pipe pig 10 travels along. For example, pipe pigs 10 according to embodiments of the invention may obtain data about the condition of the pipe such that the condition of the pipe may be monitored and any defects can be detected.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any, novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A pipe pig for travelling along a bore of a pipe, the pipe pig comprising:
a tubular body extending along a longitudinal axis between a first end and a second end; and
a plurality of discs extending radially from the longitudinal axis;
wherein at least one of the discs is a sensor disc that includes a plurality of electromagnetic sensors embedded therein, and
wherein the plurality of electromagnetic sensors include means for inducing an electric current in a wall of the pipe, and means for receiving an electromagnetic signal from the wall of the pipe, such that data about the pipe wall can be obtained as the pipe pig travels along the bore of the pipe
wherein at least one of the plurality of discs is a pigging disc that is configured to receive and redirect force from a fluid flowing within the bore of the pipe so as to propel the pipe pig along the pipe;
wherein at least one of the plurality of discs is a guardian disc that has a smaller diameter relative to the pigging disc;
wherein at least one sensor disc is axially disposed between one of the pigging discs and one of the guardian discs.

2. The pipe pig of claim 1, wherein the means for inducing an electric current in the wall of the pipe include a generating coil for producing a magnetic field.

3. The pipe pig of claim 2, wherein the generating coil produces a time varying magnetic field.

4. The pipe pig of claim 1, wherein the means for inducing an electric current in the wall of the pipe include a magnet.

5. The pipe pig of claim 4, wherein the magnet is a permanent magnet.

6. The pipe pig of claim 1, wherein the means for receiving an electromagnetic signal from the wall of the pipe include a receiving sensor.

7. The pipe pig of claim 1, wherein the plurality of electromagnetic sensors are disposed on one or more carriers that are disposed in at least one of the discs.

8. The pipe pig of claim 1, wherein the tubular body includes an internal cavity for containing one or more electronic components.

9. The pipe pig of claim 8, wherein the one or more electronic components includes an electrical power source for supplying electrical power to the plurality of electromagnetic sensors.

10. The pipe pig of claim 1, wherein at least one of the plurality of discs comprises a deformable material.

11. The pipe pig of claim 10, wherein the deformable material is a plastics material.

12. The pipe pig of claim 1, comprising at least one sensor disc adjacent the first end of the tubular body and at least one sensor disc adjacent the second end of the tubular body.

13. The pipe pig of claim 1, comprising at least one pigging disc adjacent the first end of the tubular body and at least one sensor disc adjacent the second end of the tubular body.

14. The pipe pig of claim 13, wherein the guardian disc is less deformable than the pigging disc and configured to limit contact between the tubular body and the pipe.

15. The pipe pig of claim 14, comprising at least one guardian disc adjacent the first end of the tubular body and at least one sensor disc adjacent the second end of the tubular body.

16. The pipe pig of claim 1, wherein each pigging disc comprises a deformable material.

17. The pipe pig of claim 1, wherein the sensor disc comprises a deformable material.

* * * * *